Figure 1:
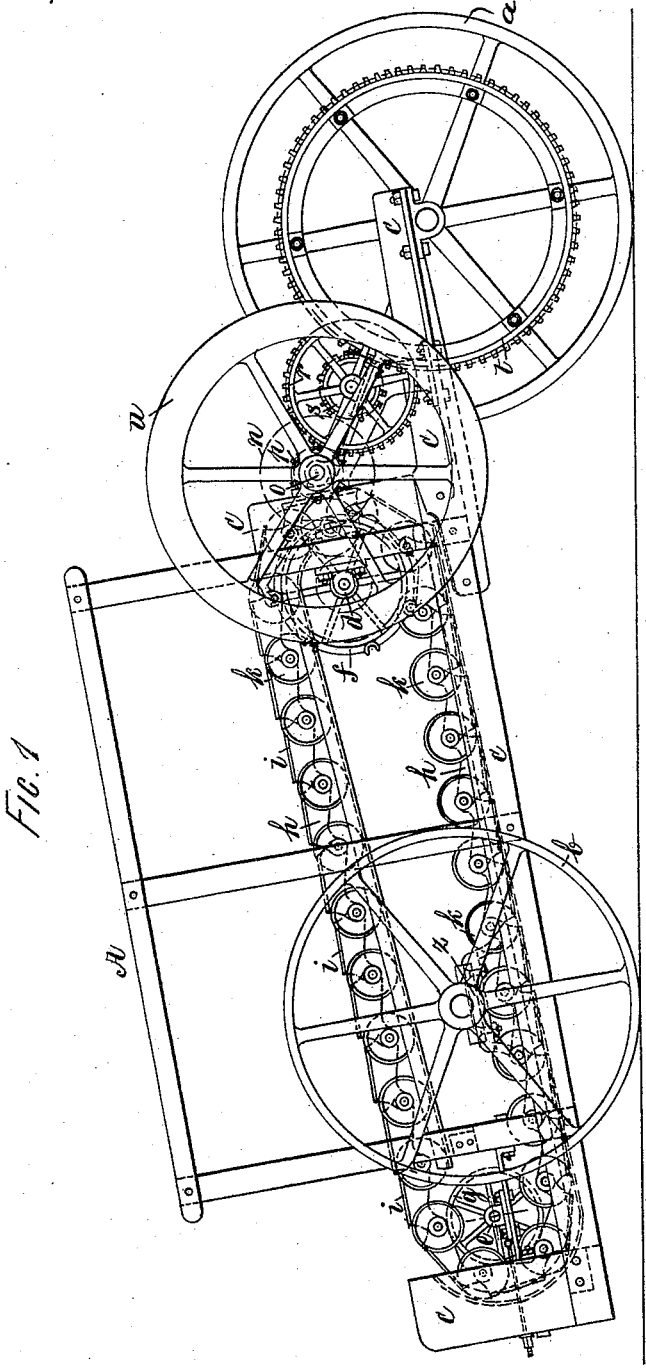

(No Model.) 2 Sheets—Sheet 1.

E. PRATT.
ROAD OR FIELD ROLLER.

No. 444,198. Patented Jan. 6, 1891.

Witnesses:
Wm H. Muzzy
E. H. Underwood

Inventor:
Edward Pratt
by W. H. Babcock
Attorney.

THE NORRIS PETERS CO., PHOTO-LITHO., WASHINGTON, D. C.

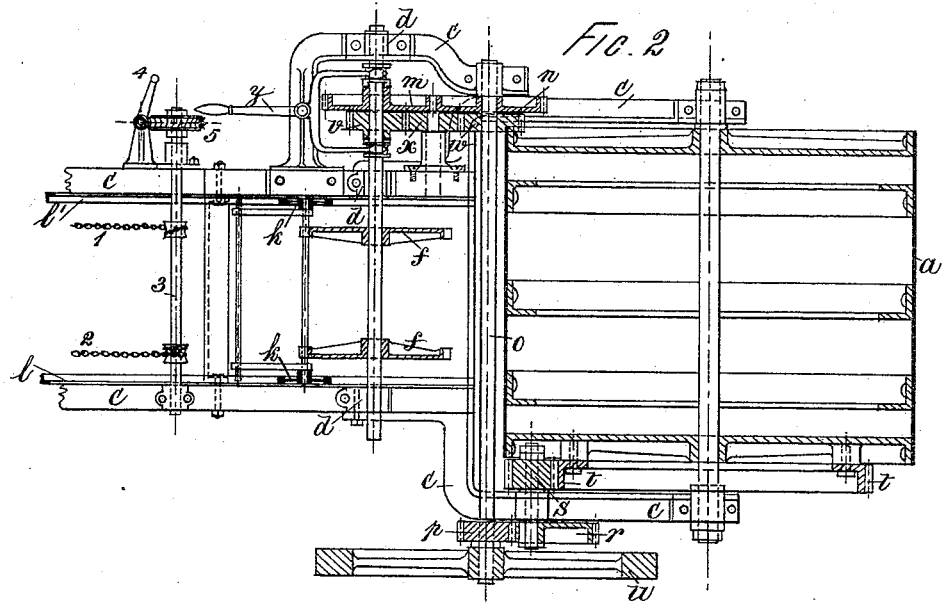

UNITED STATES PATENT OFFICE.

EDWARD PRATT, OF UXBRIDGE, COUNTY OF MIDDLESEX, ENGLAND.

ROAD OR FIELD ROLLER.

SPECIFICATION forming part of Letters Patent No. 444,198, dated January 6, 1891.

Application filed April 22, 1890. Serial No. 348,969. (No model.) Patented in England March 21, 1888, No. 4,370, and in France January 26, 1889, No. 195,652.

*To all whom it may concern:*

Be it known that I, EDWARD PRATT, engineer, a subject of the Queen of Great Britain, residing at Uxbridge, in the county of Middlesex, England, have invented certain new and useful Improvements in Road or Field Rollers, (for which I have obtained patents in Great Britain, March 21, 1888, No. 4,370, and in France January 26, 1889, No. 195,652,) of which the following is a specification.

My invention relates to improvements in rollers actuated by horse-power or men and used for rolling roads, fields, cricket-grounds, lawns, or other places where it is desirable that the surface rolled should not be marked or injured by the feet of the animals or persons using the roller.

It has for its object a novel method of construction by which the roller is made locomotive, the horses or other animals or the persons propelling it being carried upon a platform supported by the frame of the roller. I attain this object by the mechanism illustrated in the accompanying drawings, in which—

Figure 1 is a side view of a machine driven by horse-power; and Fig. 2 is a plan, partly in section, showing the driving-gear. Fig. 3 is a transverse section.

Similar letters of reference refer to similar parts in the several figures.

$a$ represents a heavy central roller, and $b$ side wheels or rollers.

$c$ is a strong frame of wood or metal, carrying the axles of the roller. Upon the frame $c$ are also fixed the bearings $d$ and $e$ for transverse shafts, upon which are fixed chain-wheels $f\,g$, round which pass endless chains $h$, formed of links jointed together and formed to receive transverse foot-boards $i$, which are fixed to them. The chains are also provided with friction-rollers $k$, which run upon rails $l$ and carry the weight of the traveling platform and horses. The bearings $e$, Fig. 1, are shown adjustable so that the chains may be kept properly stretched.

The shaft of the chain-wheels $f$ has fixed upon it a toothed driving-wheel $m$, which gears with a corresponding toothed wheel $n$ upon the intermediate transverse shaft $o$, which also carries a toothed pinion $p$, driving a corresponding toothed wheel $r$ upon a shaft, which also has fixed upon it a toothed pinion $s$, gearing with and driving a corresponding toothed wheel $t$, formed or fixed upon the heavy roller $a$. The shaft $o$ is also shown carrying a fly-wheel $u$, to which a brake may be fitted.

$v$ and $w$ are toothed pinions upon the chain-wheel shaft and upon the intermediate shaft $o$, and they gear with an intermediate pinion $x$. Clutches are shown operated, when desired, by the handle $y$, so that either of the toothed wheels $m$ or $v$ can be connected with the shaft for the purpose of reversing the movement of the roller $a$ or of stopping it altogether by throwing them both out of gear.

The axle of the wheels or rollers $b$ turns upon a central vertical axis at $z$, Fig. 1, and is connected by chains 1 2, Fig. 2, to drums upon a transverse axle or shaft 3, which can be turned round in either direction by a person carried upon the machine and turning the handle 4, which drives by an endless screw the wheel 5 upon the shaft 3. In this way the entire machine can be readily steered in any desired direction.

In order to put the machine in operation one or more horses or other animals or men stand upon the platform formed by the boards $i$, preferably with a railing or guards A. By the action of their feet the endless platform is driven backward, and by means of the toothed gear described the entire roller is driven forward or backward and is steered in any direction by the handle 4.

In light machines the steering-wheel may itself be held sufficiently firm in the hands of the person using it to form an abutment for the thrust of his feet backward against the traveling platform, or a separate rail or support may be used for the purpose.

By my invention grass or other surface is readily and easily rolled without its surface being injured, and the whole weight of the animals or persons propelling it operate in aid of the weight of the roller itself.

The apparatus may be varied more or less to suit the circumstances in which it is to be used. Different powers and speed may be attained as required by varying the proportions of the toothed wheels or chain-wheels used, and clutches may be used for throwing the driving-gear in or out of action and for reversing the direction of movement.

The lower back end of the traveling platform is preferably arranged so near to the ground that a horse or other animal can readily step on or off it.

Where horse-power is not to be used the toothed wheels or endless chains which drive the roller-axle, as described, may, if preferred, be driven by manual power, or the feet acting upon handles or treadles instead of by the feet propelling an endless traveling platform. Additional toothed wheels of suitable size may be provided, by which the speed of the machine may be varied as desired.

Instead of toothed wheels, chain-wheels and chains or equivalent devices may be used.

Where more than one horse or other animal is to be used they may be placed abreast or in front of each other. A mowing-machine may be arranged in front of the roller.

What I claim, and desire to secure by Letters Patent of the United States, is—

1. The combination of the heavy roller $a$, endless traveling platform $i$, and gear $m$, $n$, $p$, $r$, $s$, and $t$, substantially as set forth and shown.

2. In combination with the traveling platform $i$, heavy roller $a$, and gear $m$, $n$, $p$, $r$, $s$, and $t$, the toothed wheels $m$ $n$, toothed wheels and pinions $v$ $w$ $x$, and clutches and handle $y$ for reversing the direction of movement of the heavy roller, substantially as set forth and shown.

In witness whereof I have hereunto signed my name in the presence of two subscribing witnesses.

EDWARD PRATT.

Witnesses:
ARTHUR E. EDWARDS,
E. SCRIVEN.